US008520495B2

(12) United States Patent
Bae et al.

(10) Patent No.: US 8,520,495 B2

(45) Date of Patent: Aug. 27, 2013

(54) DEVICE AND METHOD FOR TRANSMITTING AND RECEIVING BROADCASTING SIGNAL

(75) Inventors: Byungjun Bae, Daejeon (KR); Yun Jeong Song, Daejeon (KR); Jong Soo Lim, Daejeon (KR); Joungil Yun, Daejeon (KR); Kwang-Yong Kim, Daejeon (KR); Kyu Tae Yang, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 13/015,168

(22) Filed: Jan. 27, 2011

(65) Prior Publication Data

US 2011/0194030 A1 Aug. 11, 2011

(30) Foreign Application Priority Data

Feb. 10, 2010 (KR) ........................ 10-2010-0012558
Oct. 19, 2010 (KR) ........................ 10-2010-0102101

(51) Int. Cl.
*H04N 5/455* (2006.01)

(52) U.S. Cl.
USPC .......................................................... 370/205

(58) Field of Classification Search
USPC .......................................................... 370/205
See application file for complete search history.

(56) References Cited

U.S. PATENT DOCUMENTS

| | | | | |
|---|---|---|---|---|
| 7,609,162 | B2 | 10/2009 | Kim et al. | |
| 2005/0010404 | A1 * | 1/2005 | Son et al. | 704/219 |
| 2009/0022234 | A1 * | 1/2009 | Wang et al. | 375/260 |
| 2009/0222855 | A1 | 9/2009 | Vare et al. | |

FOREIGN PATENT DOCUMENTS

| | | | |
|---|---|---|---|
| KR | 10-0652023 | B1 | 11/2006 |
| KR | 10-0874018 | B1 | 12/2008 |

* cited by examiner

*Primary Examiner* — Sulaiman Noristany

(74) *Attorney, Agent, or Firm* — Nelson Mullins Riley & Scarborough LLP

(57) ABSTRACT

A broadcasting signal transmitting device transmits a broadcasting signal including a base layer signal and an enhancement layer signal as well as an additional layer signal relating to the broadcasting signal to a broadcasting signal receiving device. The broadcasting signal receiving device selectively provides the enhancement layer signal and the additional layer signal to the user according to the user's service level. Accordingly, various services are differently provided to the user according to the user level.

9 Claims, 10 Drawing Sheets

DEVICE AND METHOD FOR TRANSMITTING AND RECEIVING BROADCASTING SIGNAL

CROSS-REFERENCE TO RELATED APPLICATION

This application claims priority to and the benefit of Korean Patent Applications No. 10-2010-0012558 filed in the Korean Intellectual Property Office on Feb. 10, 2010 and No. 10-2010-0102101 filed therein on Oct. 19, 2010, the entire contents of which are incorporated herein by reference.

BACKGROUND OF THE INVENTION (a) Field of the Invention

The present invention relates to a device and method for transmitting and receiving broadcasting signals.

(b) Description of the Related Art

A digital multimedia broadcasting system such as an advanced terrestrial digital multimedia broadcasting (AT-DMB) system provides broadcasting signals generated by adding enhancement layer signals to base layer signals for transmitting a basic digital multimedia broadcasting service by using a hierarchical modulation scheme. Hence, the digital multimedia broadcasting system can provide high-quality broadcasting services to users by using the hierarchical modulation characteristic.

As high-quality broadcasting services have been provided, AT-DMB terminals have been widely spread. Therefore, the digital multimedia broadcasting system requires developments on various broadcasting services using the hierarchical modulation characteristic.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method for transmitting and receiving broadcasting signals for providing various broadcasting services.

An exemplary embodiment of the present invention provides a method for a broadcasting signal transmitting device to transmit a broadcasting signal, including: generating a base layer signal by processing a first service stream; generating an enhancement layer signal by processing a second service stream added to the first service stream; generating an additional layer signal by processing a third service stream relating to the first service stream and differing from the second service stream; generating a hierarchical modulation signal by hierarchically modulating the base layer signal and the enhancement layer signal; and outputting the hierarchical modulation signal and the additional layer signal.

Another embodiment of the present invention provides a method for a broadcasting signal receiving device to receive a broadcasting signal, including: receiving a broadcasting signal; receiving an additional signal relating to the broadcasting signal; outputting a hierarchical modulation signal by demodulating the broadcasting signal; demodulating the hierarchical modulation signal into a base layer signal and an enhancement layer signal; demodulating the additional signal into an additional layer signal; outputting a first service stream by processing the base layer signal; selectively outputting a second service stream added to the first service stream by selectively processing the enhancement layer signal according to the user's service level information; and selectively outputting a third service stream relating to the first service stream and differing from the second service stream by selectively processing the additional layer signal according to the user's service level information.

Yet another embodiment of the present invention provides a device for transmitting a broadcasting signal including a base layer signal processor, an enhancement layer signal processor, an additional layer signal processor, a hierarchical modulator, and a transmitter.

The base layer signal processor generates a base layer signal by processing a first service stream.

The enhancement layer signal processor generates an enhancement layer signal by processing a second service stream added to the first service stream.

The additional layer signal processor generates an additional layer signal by processing a third service stream relating to the first service stream and differing from the second service stream The hierarchical modulator generates a hierarchical modulation signal by hierarchically modulating the base layer signal and the enhancement layer signal.

The transmitter outputs the hierarchical modulation signal and the additional layer signal.

Yet another embodiment of the present invention provides a device for receiving a broadcasting signal, including a receiver, a hierarchical demodulator, a base layer receiving processor, an enhancement layer receiving processor, an additional layer receiving processor, and a controller.

The receiver receives a broadcasting signal and an additional signal relating to the broadcasting signal and demodulates them into a hierarchical modulation signal and an additional layer signal.

The hierarchical demodulator demodulates the hierarchical modulation signal into a base layer signal and an enhancement layer signal, and outputs the base layer signal and the enhancement layer signal The base layer receiving processor outputs a first service stream by processing the base layer signal.

The enhancement layer receiving processor outputs a second service stream added to the first service stream by processing the enhancement layer signal.

The additional layer receiving processor outputs a third service stream relating to the first service stream and differing from the second service stream by processing the additional layer signal.

The controller stores a user's service level information, and controls outputs of the enhancement layer signal and the additional layer signal according to the user's service level information

DETAILED DESCRIPTION OF THE EMBODIMENTS

Figure 1:
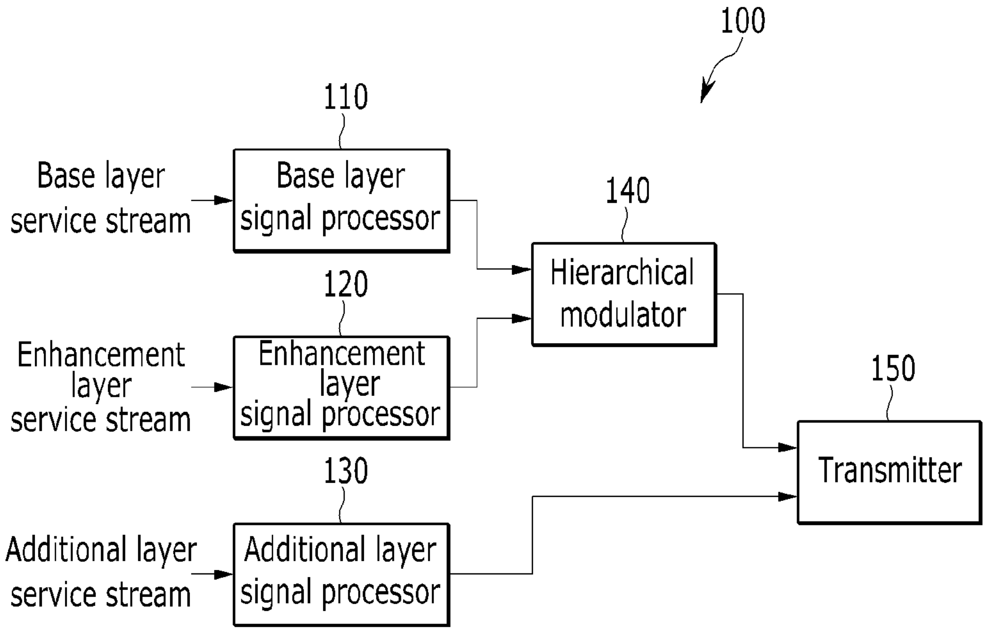
FIG. 1 shows a block diagram of a broadcasting signal transmitting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A broadcasting signal transmitting/receiving method and device according to an exemplary embodiment of the present invention will now be described with reference to the accompanying drawings.

Figure 2:
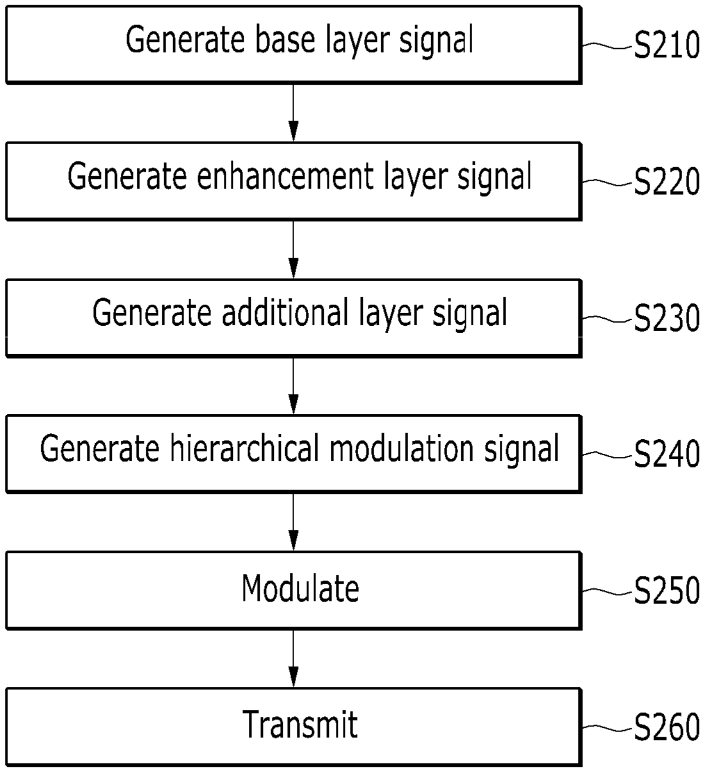
FIG. 2 shows a flowchart of a broadcasting signal transmitting method according to an exemplary embodiment of the present invention.

FIG. 1 shows a block diagram of a broadcasting signal transmitting device according to an exemplary embodiment of the present invention, and FIG. 2 shows a flowchart of a broadcasting signal transmitting method according to an exemplary embodiment of the present invention.

Referring to FIG. 1, the broadcasting signal transmitting device 100 includes a base layer signal processor 110, an enhancement layer signal processor 120, an additional layer signal processor 130, a hierarchical modulator 140, and a transmitter 150.

Referring to FIG. 2, the base layer signal processor 110 generates a base layer signal by processing a base layer service stream (S210).

The enhancement layer signal processor 120 generates an enhancement layer signal by processing an enhancement layer service stream having greater quality than the base layer service stream (S220).

For example, the broadcasting signal transmitting device 100 can be an advanced terrestrial digital multimedia broadcasting (AT-DMB) transmitter. In this case, the base layer supports terrestrial a digital multimedia broadcasting (T-DMB) service, and an enhancement layer is added to increase transmission capacity of the T-DMB.

The additional layer signal processor 130 generates an additional layer signal by processing an additional layer service stream (S230). The additional layer is different from the base layer and the enhancement layer, and it supports the broadcasting signal configured with the base layer signal and the enhancement layer signal and other additional information relating to the broadcasting signal. For example, when the base layer signal and the enhancement layer signal are a broadcasting program of a broadcasting channel, the additional layer signal may correspond to a data service including an item relating to an actor of the broadcasting program.

That is, the additional layer service stream may includes at least one of the audio, video, and data service streams in connection with the communication network including the wireless communication network, the mobile communication network, and the data communication network.

The hierarchical modulator 140 generates a hierarchical modulation signal by hierarchically modulating the base layer signal and the enhancement layer signal (S240).

The transmitter 150 performs a multiplexing modulation process (e.g., orthogonal frequency division multiplexing (OFDM) modulation on the hierarchical modulation signal and transmits the signal as a broadcasting signal through the broadcasting network (S250-S260), and performs a multiplexing modulation process on the additional layer signal and transmits the signal as a communication signal through the communication network (S250-S260).

Accordingly, new services based on the broadcasting network and the communication network can be provided to the user. In addition, a further detailed broadcasting service can be provided to the user from the broadcasting signal corresponding to the base layer signal and the enhancement layer signal and the communication signal corresponding to the additional layer signal.

Figure 3:
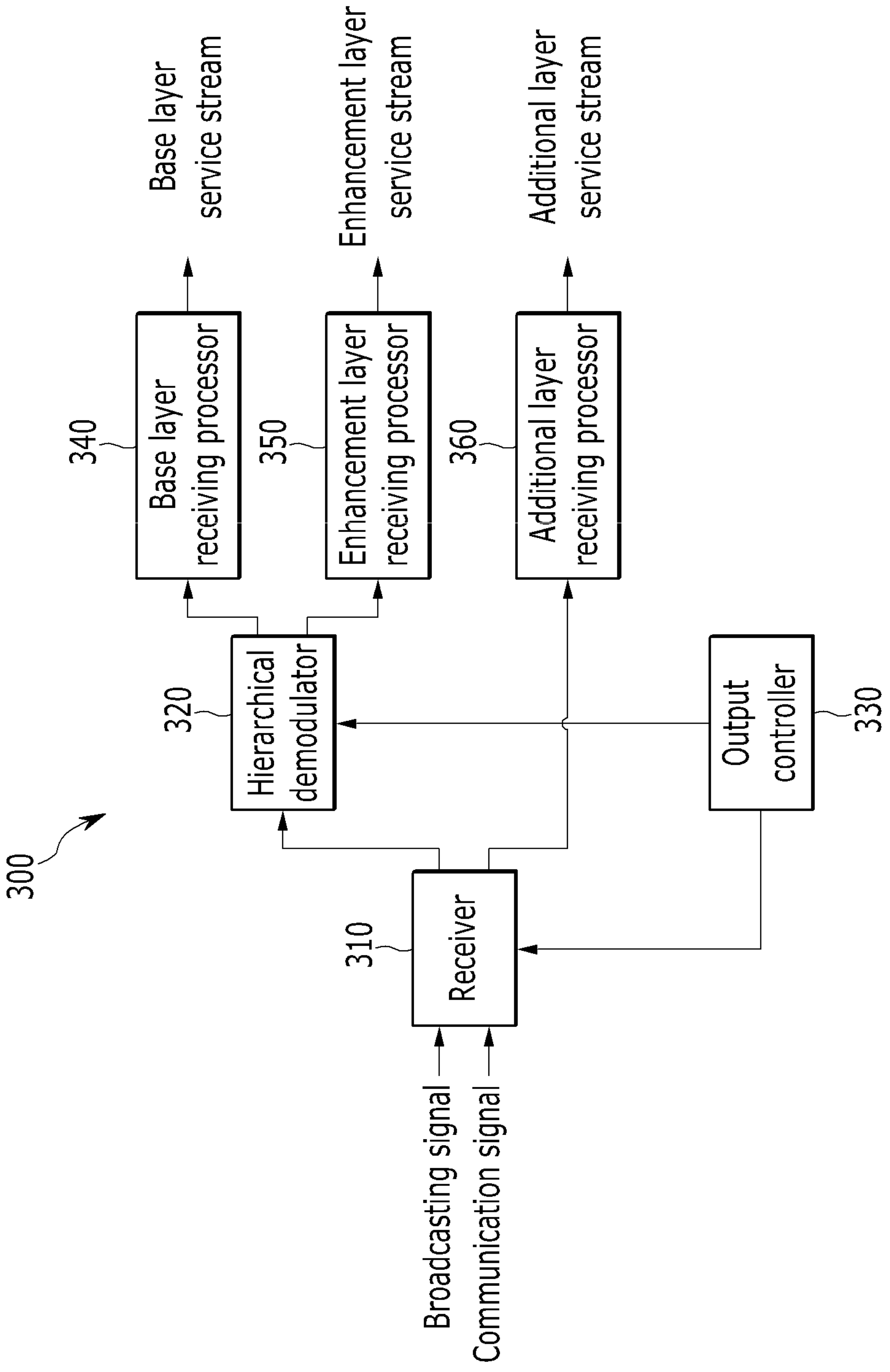
FIG. 3 shows a block diagram of a broadcasting signal receiving device according to an exemplary embodiment of the present invention.
Figure 4:
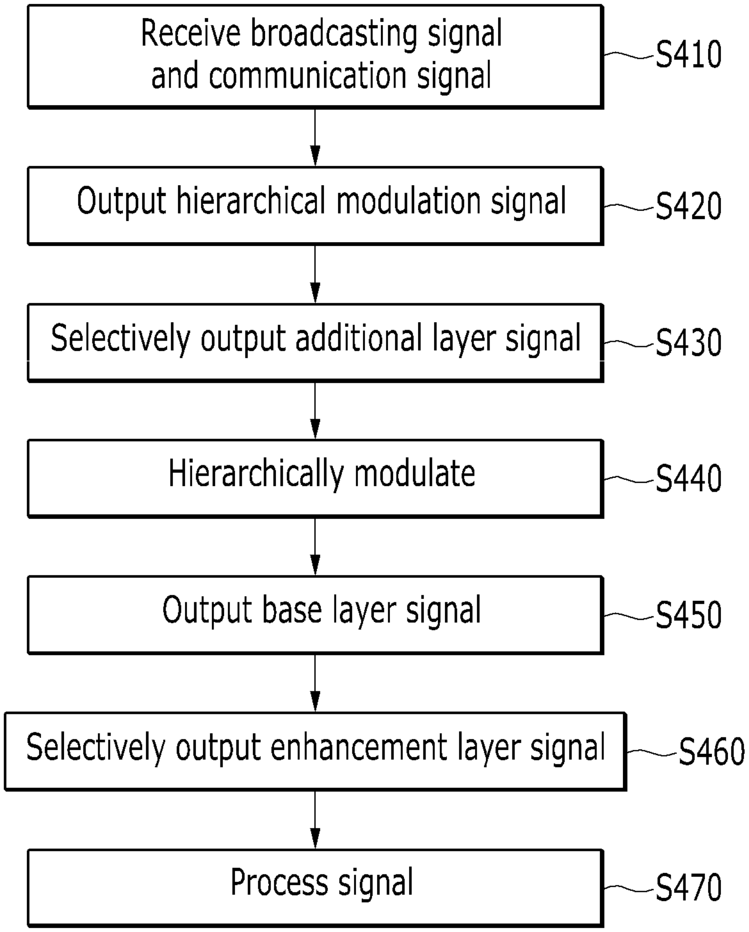
FIG. 4 shows a flowchart of a broadcasting signal receiving method according to an exemplary embodiment of the present invention.

FIG. 3 shows a block diagram of a broadcasting signal receiving device according to an exemplary embodiment of the present invention, and FIG. 4 shows a flowchart of a broadcasting signal receiving method according to an exemplary embodiment of the present invention. Also, FIG. 5 to FIG. 10 show examples of broadcasting services provided by a broadcasting signal receiving device according to an exemplary embodiment of the present invention.

Referring to FIG. 3, the broadcasting signal receiving device 300 includes a receiver 310, a hierarchical demodulator 320, an output controller 330, a base layer receiving processor 340, an enhancement layer receiving processor 350, and an additional layer receiving processor 360.

Referring to FIG. 4, the receiver 310 receives a broadcasting signal and a communication signal (S410). The receiver 310 demodulates (e.g., OFDM-demodulates) the received broadcasting signal to output a hierarchical modulation signal (S420), and demodulates the communication signal received according to control of the output controller 330 to selectively output an additional layer signal (S430). That is, the receiver 310 can output the hierarchical modulation signal, or output the hierarchical modulation signal and the additional layer signal.

The hierarchical demodulator 320 hierarchically demodulates the hierarchical modulation signal to output a base layer signal and an enhancement layer signal (S440-S460). In this instance, the hierarchical demodulator 320 selectively outputs the enhancement layer signal by the control of the output controller 330 (S460). That is, the hierarchical demodulator 320 can output the base layer signal (S450) or output the base layer signal and the enhancement layer signal simultaneously (S460).

The output controller 330 stores service level information of a registered user and controls the receiver 310 and the hierarchical demodulator 320 according to level information of the user having requested a broadcasting service.

The base layer receiving processor 340 outputs a base layer service stream by processing the base layer signal.

The enhancement layer receiving processor 350 outputs an enhancement layer service stream by processing the enhancement layer signal.

The additional layer receiving processor 360 outputs an additional layer service stream by processing the additional layer signal.

That is, the base layer receiving processor 340, the enhancement layer receiving processor 350, and the additional layer receiving processor 360 respectively process the input base layer signal, the enhancement layer signal, and the additional layer signal (S470).

Then, various services are provided to the users in different ways according to the users' service levels. A broadcasting service to be provided by the user levels will now be described with the assumption that the service level of the user is set to be one of the first stage to third stage.

Figure 5:
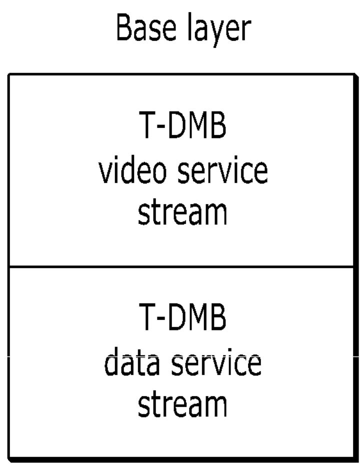
FIG. 5 to FIG. 10 show examples of broadcasting services provided by a broadcasting signal receiving device according to an exemplary embodiment of the present invention.

The output controller 330 controls the receiver 310 and the hierarchical demodulator 320 so as to output the base layer signal when the service level of the user having requested the broadcasting service is the first stage. Then, the base layer service stream is provided to the user. In this instance, for example, the base layer service stream can include a T-DMB video service stream and a T-DMB data service stream as shown in FIG. 5, so when the user's service level is the first stage, the broadcasting service of the T-DMB video service stream and the T-DMB data service stream is provided to the user.

However, when the user's service level is the second stage, the output controller 330 controls the receiver 310 and the hierarchical demodulator 320 so as to output the base layer signal and the enhancement layer signal. That is, the additional layer signal is not output. Then, the base layer service stream and the enhancement layer service stream are simultaneously provided to the user, which provides higher-quality broadcasting service than the case in which the user's service level is the first stage.

Figure 6:
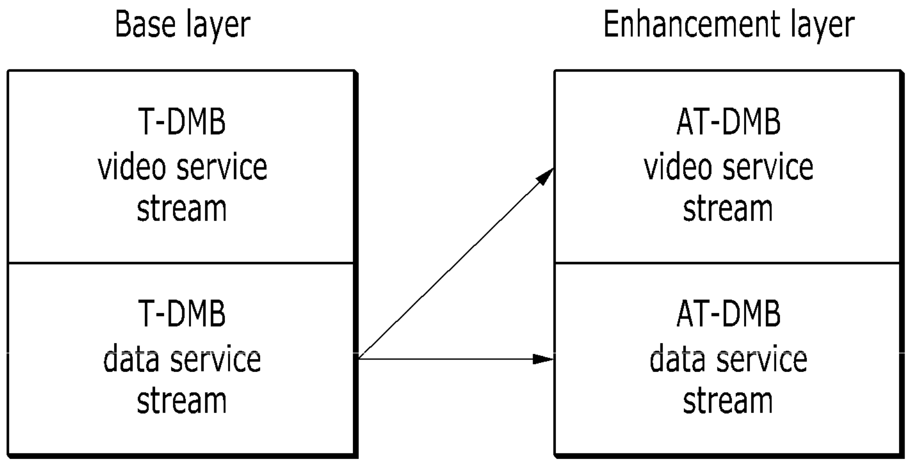
Figure 7:
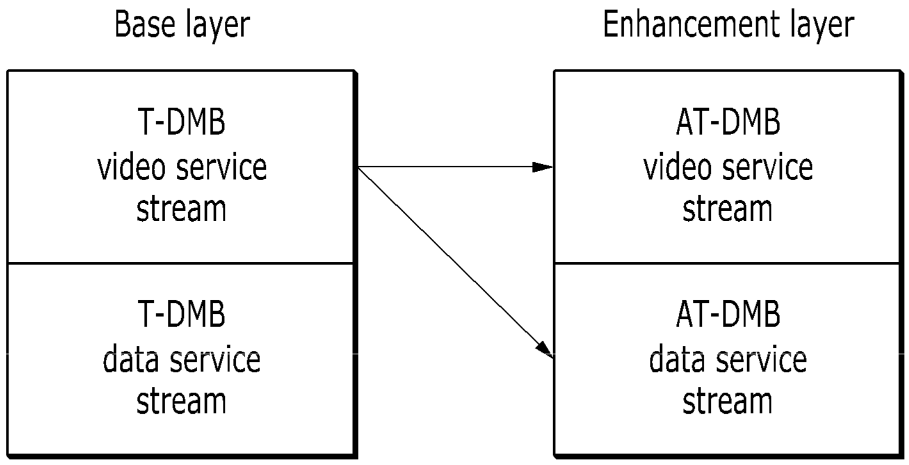

For example, as shown in FIG. 6, the enhancement layer service stream can include an AT-DMB video service stream and an AT-DMB data service stream. Accordingly, for example, when the user's service level is the second stage, a broadcasting service in the combination form of the enhancement layer service stream and T-DMB data service stream can be provided to the user as shown in FIG. 6, and a broadcasting service in the combination form of the enhancement layer service stream and the T-DMB video service stream can be provided to the user as shown in FIG. 7.

Further, when the user's service level is the third stage, the output controller 330 controls the receiver 310 to output the additional layer signal, and simultaneously controls the hierarchical demodulator 320 to output the base layer signal or both the base layer signal and the enhancement layer signal, thereby providing the additional layer service stream to the user.

Figure 8:
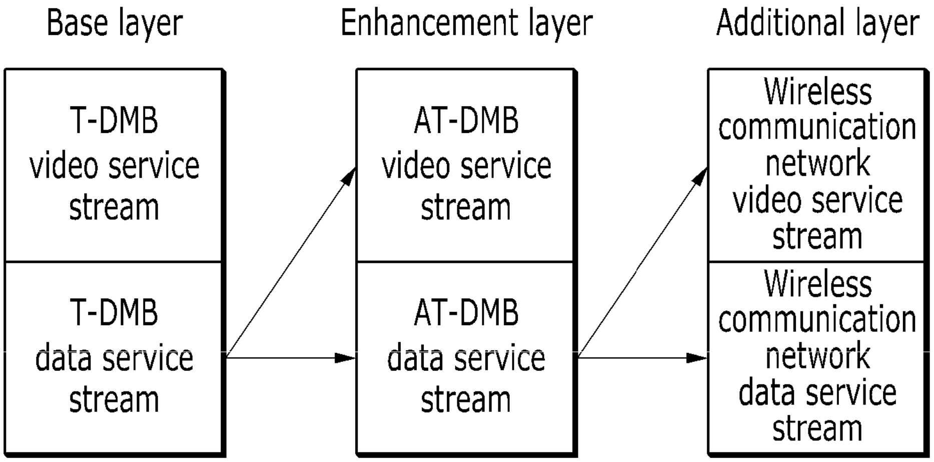
Figure 9:
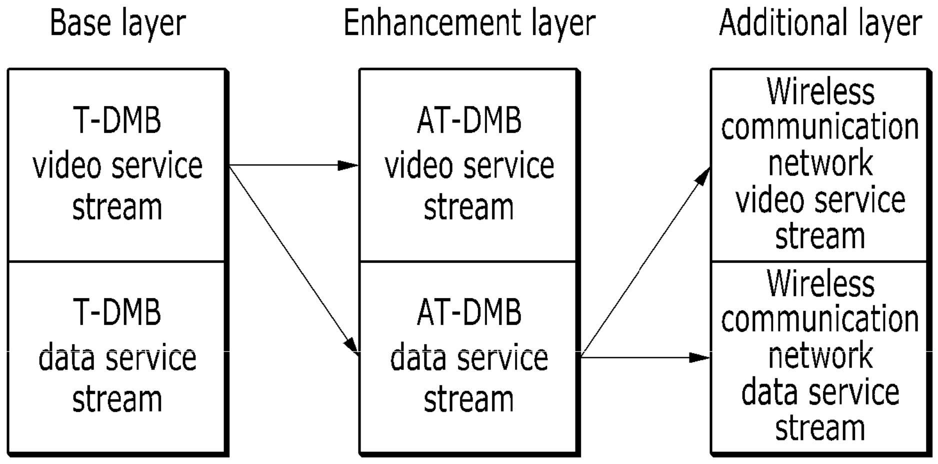
Figure 10:
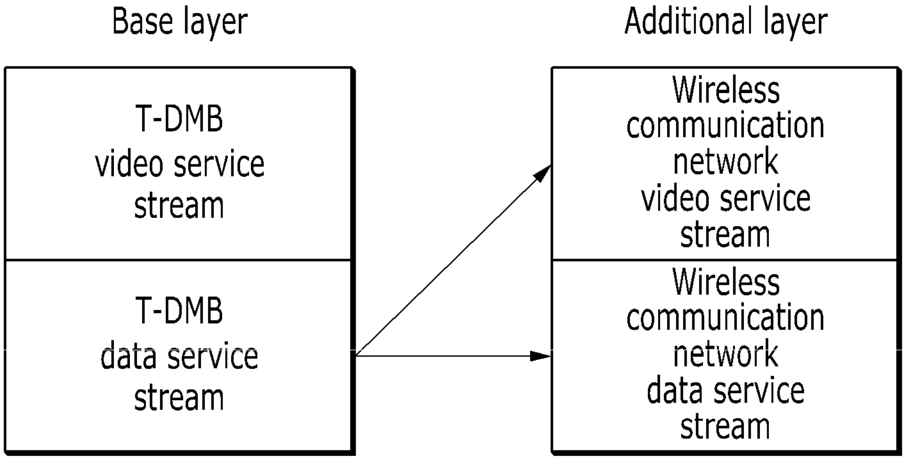

For example, as shown in FIG. 8, the additional layer service stream includes a wireless communication network video service and a wireless communication network data service. Accordingly, for example, when the user's service level is the third stage, a broadcasting service in the combination form of the T-DMB data service stream, the enhancement layer service stream, and the additional layer service stream is provided to the user as shown in FIG. 8, and a broadcasting service in the combination form of the T-DMB video service stream, the enhancement layer service stream, and the additional layer service stream is provided to the user as shown in FIG. 9. Also, as shown in FIG. 10, a broadcasting service in the combination form of the T-DMB data service stream and the additional layer service stream can be provided to the user. In addition to this, various services can be provided to the user with various combinations of the base layer service stream, the enhancement layer service stream, and the additional layer service stream according to the user's service levels.

Therefore, the user can use various types of broadcasting services according to the subscribed service level while using the T-DMB broadcasting service without payment. In detail, the user with the first-stage service level can receive the T-DMB-based broadcasting service for free. The user with the second-stage service level receives the T-DMB-based broadcasting service provided as a default and then can use the AT-DMB broadcasting service that is an additional service relating to the T-DMB-based broadcasting service as an enhancement layer. For example, the user with the second-stage service level uses the T-DMB-based BWS service and can receive and uses a BWS service having detailed information through the enhancement layer so as to use further detailed information.

Further, the user with the third-stage service level can use the T-DMB and the AT-DMB-based broadcasting service and can also use the services provided through the communication network. That is, the user with the third-stage service level views the T-DMB-based broadcasting service and then can use the broadcasting service provided through the enhancement layer so as to view detailed information. In this instance, the user can receive corresponding detailed service through the communication network so as to use another type of information relating to the broadcasting service. Accordingly, when using the communication network, a communication channel fee as well as a service level fee can be additionally charged. Hence, the user with the third-stage service level can use the broadcasting service provided to the enhancement layer in advance so as to not pay the communication channel.

According to the exemplary embodiments of the present invention, various hierarchical broadcasting services can be provided to users by using the hierarchical modulation characteristic. Based upon this, the users can use information with appropriate degrees according to subscribed service levels, thereby increasing usage efficiency of data resources.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a broadcasting signal receiving device to receive a broadcasting signal, comprising:

receiving a broadcasting signal;

receiving an additional signal relating to the broadcasting signal;

outputting a hierarchical modulation signal by demodulating the broadcasting signal;

demodulating the hierarchical modulation signal into a base layer signal and an enhancement layer signal;

demodulating the additional signal into an additional layer signal;

outputting a first service stream by processing the base layer signal;

selectively outputting a second service stream added to the first service stream by selectively processing the enhancement layer signal according to the user's service level information;

selectively outputting a third service stream relating to the first service stream and differing from the second service stream by selectively processing the additional layer signal according to the user's service level information;

wherein the selectively outputting of the third stream includes outputting the third service stream when the user's service level is the highest level;

wherein when the user's service level is other than the lowest level and the highest level, the selectively outputting of the second service stream includes outputting the second service stream, and the selectively outputting of the third service stream includes outputting no third service stream when the user's service level is the lowest level.

2. The method of claim 1, wherein the selectively outputting of the second service stream includes outputting no second service stream when the user's service level is the lowest level, and the selectively outputting of the third service stream includes outputting no third service stream when the user's service level is the lowest level.

3. The method of claim 1, wherein the selectively outputting of the second service stream includes outputting the second service stream when the user's service level is the highest level.

4. The method of claim 1, wherein the selectively outputting of the second service stream includes outputting no second service stream when the user's service level is the highest level.

5. The method of claim 1, wherein the receiving of the broadcasting signal includes receiving the broadcasting signal through a broadcasting network, and the receiving of the additional signal includes receiving the additional signal through a communication network.

6. The method of claim 5, wherein the third service stream includes at least one of audio, video, and data service streams relating to the communication network.

7. A device for receiving a broadcasting signal, comprising:

a receiver for receiving a broadcasting signal and an additional signal relating to the broadcasting signal and demodulating them into a hierarchical modulation signal and an additional layer signal;

a hierarchical demodulator for demodulating the hierarchical modulation signal into a base layer signal and an enhancement layer signal and outputting the base layer signal and the enhancement layer signal;

a base layer receiving processor for outputting a first service stream by processing the base layer signal;

an enhancement layer receiving processor for outputting a second service stream added to the first service stream by processing the enhancement layer signal;

an additional layer receiving processor for outputting a third service stream relating to the first service stream and differing from the second service stream by processing the additional layer signal;

a controller for storing a user's service level information, and controlling outputs of the enhancement layer signal and the additional layer signal according to the user's service level information;

wherein when the user's service level is the lowest level, the hierarchical demodulator does not output the enhancement layer signal, and the receiver does not output the additional layer signal;

wherein when the user's service level is the highest level, the hierarchical demodulator selectively outputs the enhancement layer signal, and the receiver outputs the additional layer signal; and wherein when the user's service level is other than the lowest level and the highest level, the hierarchical demodulator outputs the enhancement layer signal, and the receiver does not output the additional layer signal.

8. The device of claim 7, wherein the receiver receives the broadcasting signal through a broadcasting network and the additional signal through a communication network.

9. The device of claim 8, wherein the third service stream includes at least one of audio, video, and data service streams relating to the communication network.

* * * * *